(12) United States Patent
Bowen

(10) Patent No.: US 11,092,070 B2
(45) Date of Patent: Aug. 17, 2021

(54) INTERNAL COMBUSTION ENGINE

(71) Applicant: NEWLENOIR LIMITED, Greater London (GB)

(72) Inventor: Ryan Bowen, London (GB)

(73) Assignee: NEWLENOIR LIMITED

( * ) Notice: Subject to any disclaimer, the term of this patent is extended or adjusted under 35 U.S.C. 154(b) by 0 days.

(21) Appl. No.: 16/479,526

(22) PCT Filed: Feb. 19, 2018

(86) PCT No.: PCT/GB2018/050433
§ 371 (c)(1),
(2) Date: Jul. 19, 2019

(87) PCT Pub. No.: WO2018/162876
PCT Pub. Date: Sep. 13, 2018

(65) Prior Publication Data
US 2019/0353095 A1  Nov. 21, 2019

(30) Foreign Application Priority Data

Mar. 7, 2017 (GB) ..................................... 1703606

(51) Int. Cl.
| | | |
|---|---|---|
| *F02B 75/26* | (2006.01) | |
| *F01B 5/00* | (2006.01) | |
| *F01B 9/06* | (2006.01) | |
| *F01M 11/02* | (2006.01) | |
| F02B 75/32 | (2006.01) | |
| *F16H 25/14* | (2006.01) | |
| *F16H 57/04* | (2010.01) | |

(52) U.S. Cl.
CPC ............ *F02B 75/265* (2013.01); *F01B 5/006* (2013.01); *F01B 9/06* (2013.01); *F01M 11/02* (2013.01);
(Continued)

(58) Field of Classification Search
CPC ........ F02B 75/265; F02B 75/32; F02B 75/40; F01B 5/006; F01B 9/06; F01M 11/02; F01M 9/10; F16H 25/14; F16H 57/0475
See application file for complete search history.

(56) References Cited

U.S. PATENT DOCUMENTS 2,407,859 A * 9/1946 Wilson .................... F16H 25/14
74/55
4,213,427 A 7/1980 Di Stefano
(Continued)

FOREIGN PATENT DOCUMENTS

CN         1040077 A      2/1990
DE   102004034719 A1     2/2006
(Continued)

OTHER PUBLICATIONS

Search Report for Application No. GB1703606.2 dated Aug. 8, 2017.
(Continued)

*Primary Examiner* — Syed O Hasan
(74) *Attorney, Agent, or Firm* — Tarolli, Sundheim, Covell & Tummino LLP

(57) ABSTRACT

An internal combustion engine has a casing and a piston arrangement including a piston coupled to a track. The track is coupled to a shaft and has an inner cam surface and an outer cam surface. The piston is coupled to the track by followers which run on the respective inner and outer cam surfaces of the track to control motion of the piston. A sliding element is connected to the piston and extends below the piston head having a profiled slider surface which engages a corresponding profile in the casing. Also, the casing includes at least two plates having a cutout for receiving the track and a bore for receiving the shaft, and at least two end plates coupled transverse to the plates. At least (Continued)

one cylinder bore is formed in the end plates, and the piston is arranged to move in reciprocating motion in the cylinder bore.

16 Claims, 13 Drawing Sheets

(52) U.S. Cl.
 CPC ............ *F02B 75/32* (2013.01); *F16H 25/14* (2013.01); *F16H 57/0475* (2013.01); *F01B 2009/065* (2013.01); *F01M 2011/026* (2013.01)

(56) References Cited

U.S. PATENT DOCUMENTS

| | | | | |
|---|---|---|---|---|
| 5,454,352 | A * | 10/1995 | Ward | .................... F01B 9/047 123/197.1 |
| 2001/0017122 | A1 | 8/2001 | Fantuzzi | |
| 2016/0333693 | A1* | 11/2016 | Bowen | .................... F16M 1/02 |

FOREIGN PATENT DOCUMENTS

| | | |
|---|---|---|
| GB | 117487 | 2/1918 |
| GB | 1295548 | 11/1972 |
| GB | 2522204 A | 7/2015 |
| JP | 08004550 A | 1/1996 |
| WO | 2014107628 A1 | 7/2014 |
| WO | 2015107330 A2 | 7/2015 |

OTHER PUBLICATIONS

International Search Report for Application No. PCT/GB2018/050433 dated Jun. 13, 2018.
International Written Opinion for Application No. PCT/GB2018/050433 dated Jun. 13, 2018.
European Office Action for Application No. 20171097.7-1004/3719255 dated Sep. 9, 2020.
Chinese Office Action for Application No. 201880012648.7 dated Jan. 14, 2021.

* cited by examiner

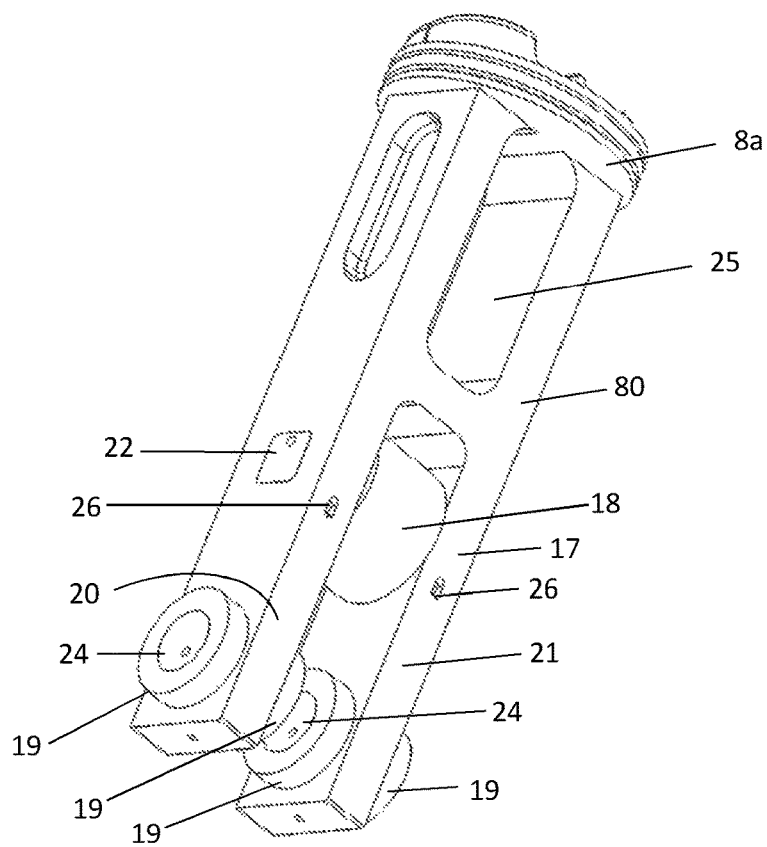
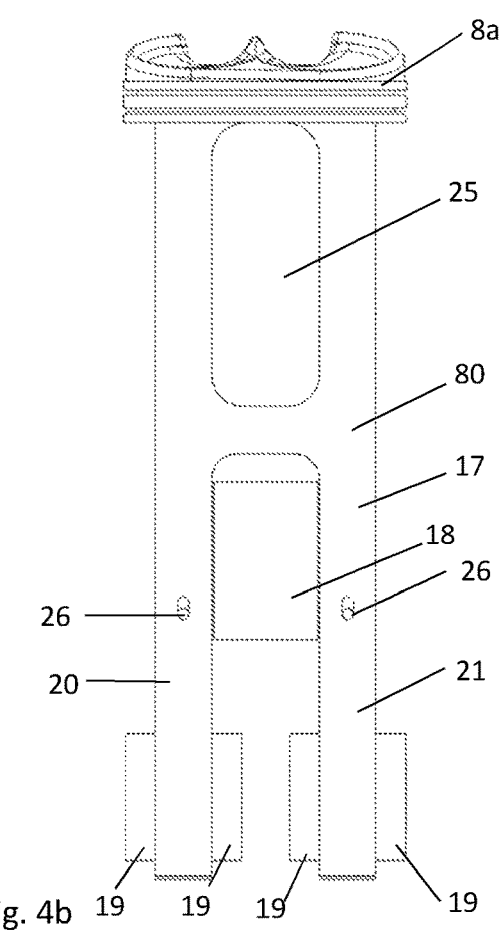
Fig. 4a
Fig. 4b

INTERNAL COMBUSTION ENGINE

RELATED APPLICATIONS

The present invention is a U.S. National Stage under 35 USC 371 patent application, claiming priority to Serial No. PCT/GB2018/050433, filed on 19 Feb. 2018; which claims priority of GB 1703606.2, filed on 7 Mar. 2017, the entirety of both of which are incorporated herein by reference.

FIELD OF THE INVENTION

The present invention relates to an internal combustion engine, and a method of assembling an internal combustion engine.

BACKGROUND OF THE INVENTION

Most internal combustion engines comprises a piston head moveable within a cylinder coupled to a crankshaft by a con-rod. In some alternative internal combustion engines, such as described in WO 2015/107330, a piston head is coupled to a track having a cam surface, the piston head being provided with one or more cam followers which run along the track to control movement of the piston head. The present invention relates to improvements in such an alternative internal combustion engine.

SUMMARY OF THE INVENTION

A first aspect of the invention provides an internal combustion engine comprising a casing and a piston arrangement including a piston coupled to a track; wherein the track is coupled to a shaft and has an inner cam surface and an outer cam surface, and the piston is coupled to the track by followers which run on the respective inner and outer cam surfaces of the track to control motion of the piston; wherein a sliding element is connected to the piston, the sliding element extending below the piston head and comprising a profiled slider surface which engages a corresponding profile in the casing, and the followers are mounted on the sliding element.

As the track rotates relative to the casing, the piston head moves in reciprocating motion according to the path of the inner and outer cam surfaces. The invention is advantageous in that the corresponding profiles of the slider and casing can constrain motion of the sliding element with respect to the casing in both directions orthogonal to the direction of motion of the reciprocating piston.

A second aspect of the invention provides an internal combustion engine comprising a piston arrangement including a piston coupled to a track; wherein the track is coupled to a shaft and has a cam surface, and the piston has a follower which runs on the cam surface of the track to control motion of the piston; the engine further comprising a casing, wherein the casing comprises at least two plates having a cutout for receiving the track and a bore for receiving the shaft, and at least two end plates coupled transverse to the plates; wherein at least one cylinder bore is formed in the end plates, and the piston is arranged to move in reciprocating motion in the cylinder bore.

A third aspect of the invention provides a method of assembling an internal combustion engine comprising a casing and a piston arrangement including a piston coupled to a track; wherein the track is coupled to a shaft and has an inner cam surface and an outer cam surface, and the piston is coupled to the track by followers which run on the respective inner and outer cam surfaces of the track to control motion of the piston; wherein a sliding element is connected to the piston, the sliding element extending below the piston head and comprising a profiled slider surface which engages a corresponding profile in the casing, and the followers are mounted on the sliding element; wherein the casing comprises at least two plates having a cutout for receiving the track and a bore for receiving the shaft, and at least two end plates, wherein at least one cylinder bore is formed in the end plates, and the piston is arranged to move in reciprocating motion in the cylinder bore; the method including the steps of: a) coupling the piston arrangement to the shaft by coupling the track to the shaft and coupling the piston to the track; b) bringing the at least two plates together on either side of the track; and c) bringing the end plates together so as to be transverse to the plates; and d) coupling the end plates to the plates.

By assembling the plates on either side of the track, the engine can be constructed easily and engine capacity can be scaled up or down by increasing or decreasing the number of tracks, pistons and used plates. The plates may be substantially identical and/or mirror images of one another. The architecture of the engine is therefore highly scalable with few components. The end plates contain the cylinder bore(s) and advantageously allow cooling passages to circulate where desired. The end plates may also provide a fixing for the cylinder head. The end plates may vary in size and configuration according to the engine capacity and number of pistons etc.

The sliding element may be rigidly attached to the piston by one or more fasteners or alternatively may be integrally formed with the piston.

The sliding element may be arranged to have a running clearance with the track.

The followers may comprise one or more plain bearings or roller bearings.

The sliding element may comprise two limbs each extending below the piston so as to straddle the track. The profiled slider surface may be provided on each limb, with each profiled slider surface engaging a respective profile in the casing.

The followers may be arranged such that at least one follower which runs on the outer cam surface of the track is located between the two limbs of the sliding element.

The followers may be arranged such that each of the two limbs of the sliding element has at least one follower which runs on the inner cam surface of the track.

The engine may further comprise a pair of timing wheels coupled to the shaft one on either side of the track, each timing wheel having an inner cam surface substantially matching the inner cam surface of the track, and wherein each limb of the sliding element has at least one follower which runs on the inner cam surface of the respective timing wheels.

The profiled slider surface may be arranged to be lubricated such that the profiled slider surface contacts the casing profile via a layer of lubricant.

The profiled slider surface may comprise an oil pick-up aperture adapted to receive oil from an elongate slot in the casing profile. The elongate slot preferably does not extend up to an end of the casing profile furthest from the piston. This may help contain the oil.

The inner and outer cam surfaces of the track may be arranged to be lubricated such that the followers contact the cam surfaces via a layer of lubricant.

The followers may each include a roller mounted on plane bearing shaft fixed to the sliding element. The plane bearing shaft may include an oil-pick up aperture adapted to receive oil from the sliding element.

The track may be a radial track with the inner and outer cam surfaces arranged as inner radial and outer radial surfaces with respect to an axis of rotation of the track.

The engine may further comprise a plurality of the piston arrangements comprising a plurality of the pistons coupled to one or more of the tracks. For example, two pistons may be coupled to one of the tracks, the pistons being coupled to substantially opposite sides of the track. Multiple tracks may be arranged along the axial shaft direction. Two such tracks may be arranged 180 degrees out of phase with one another on the shaft for balancing the engine.

Each track may be accompanied by a pair of timing wheels. The pair of timing wheels may be arranged one on each side of the track. Each timing wheel may comprise a cam surface. The cam surface of the timing wheel may correspond with the path of one of the inner or outer cam surfaces of the respective track.

The casing may comprise at least two plates having a cutout for receiving the track and a bore for receiving the shaft, and at least two end plates coupled transverse to the plates. At least one cylinder bore may be formed in the end plates, and the piston may be arranged to move in reciprocating motion in the cylinder bore.

One plate may be provided between each track and timing wheel along the shaft axial direction. A side plate may be attached to an outer side of the plate(s) in the shaft axial direction. The plates of the casing may be attached together by a plurality of fasteners. The end plates may assist in retaining the plates together.

BRIEF DESCRIPTION OF THE DRAWINGS

Embodiments of the invention will now be described with reference to the accompanying drawings, in which:

FIGS. 4a and 4b show perspective and front views of the piston and sliding element having followers;

DETAILED DESCRIPTION OF EMBODIMENT(S)

Figure 1:
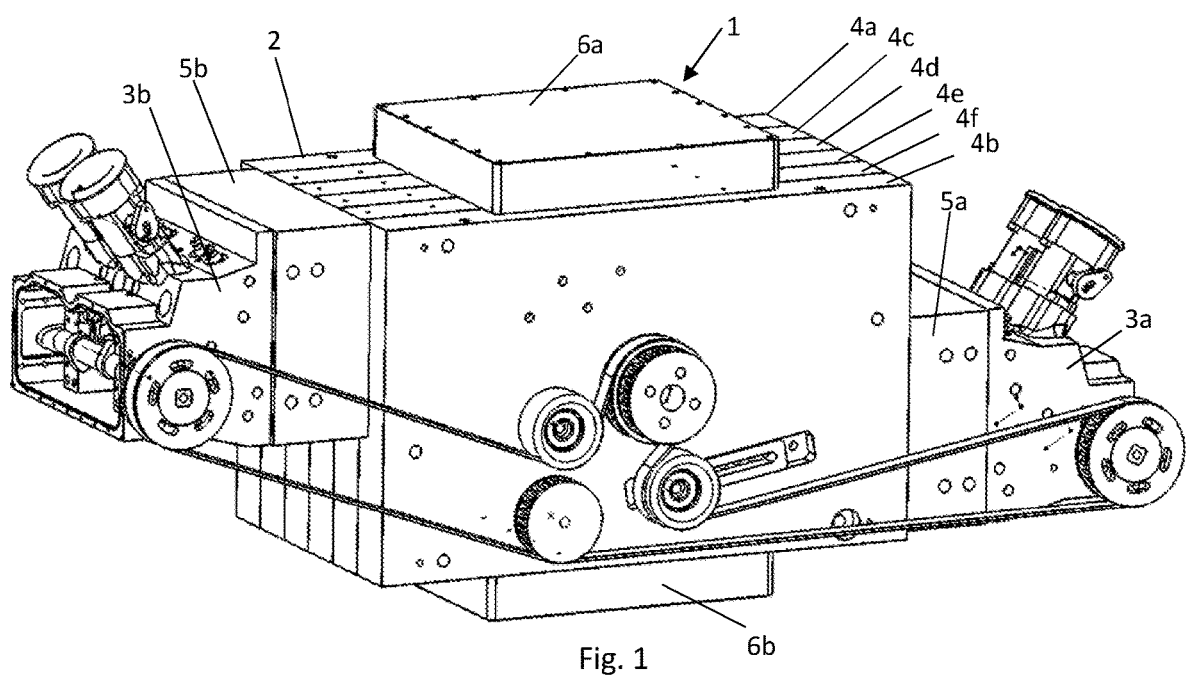
FIG. 1 shows an engine.

FIG. 1 shows an internal combustion engine 1 comprising a block assembly 2, two head assemblies 3a, 3b and an exhaust system (omitted). The head assemblies 3a, 3b and exhaust system will not be discussed in detail here. The block assembly 2 comprises a plurality of casing members, or plates, including side plates 4a, 4b, fin plates 4c, 4d, 4e, 4f, end plates 5a, 5b, top cover 6a and bottom cover 6b.

Figure 2:
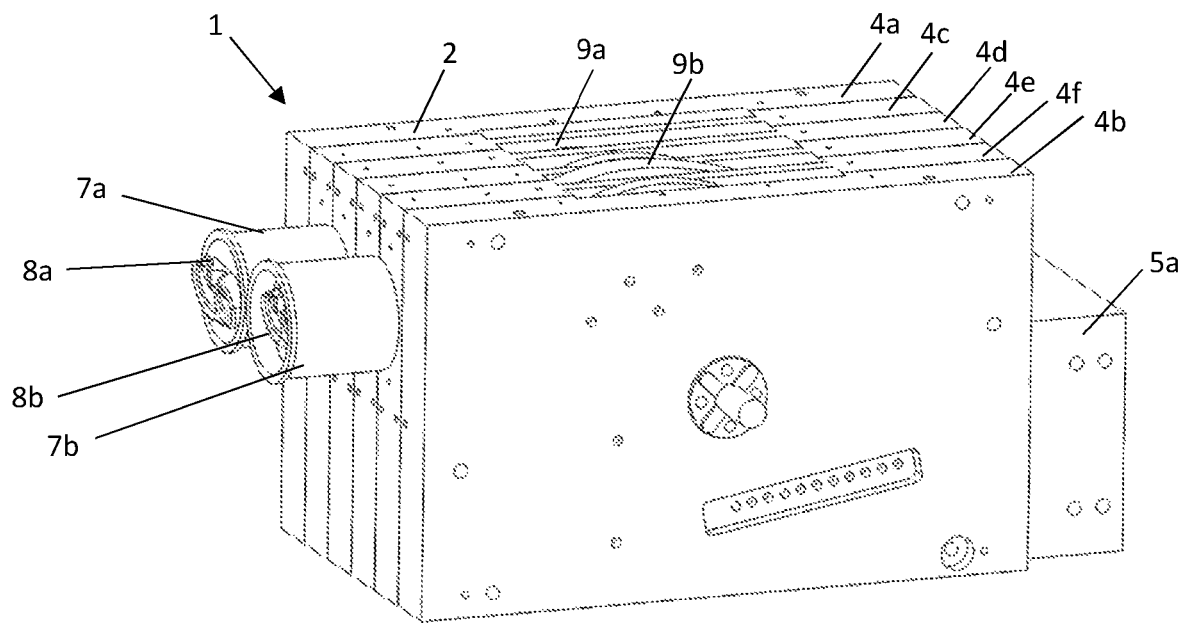
FIG. 2 shows the engine with various components omitted.

FIG. 2 shows the engine 1 with the head assemblies 3a, 3b, top and bottom covers 6a, 6b and end plate 5b removed so that further parts of the engine are visible. The end plate 5b has two bores, each bore receiving a respective cylinder liner 7a, 7b, each cylinder liner receiving a respective piston 8a, 8b, the heads of which are visible in FIG. 2. Likewise, although not shown in FIG. 2, the end plate 5a has two bores for two further cylinder liners of respective pistons. The engine 1 has a total of four pistons coupled in an opposed relationship to two tracks 9a, 9b, the tops of which are visible in FIG. 2. The engine 1 therefore includes four piston assemblies and the structure and functioning of the first piston assembly will be described in detail, although it will be appreciated that the second, third and fourth piston assemblies are structurally and functionally similar to the first piston assembly.

Figure 3A:
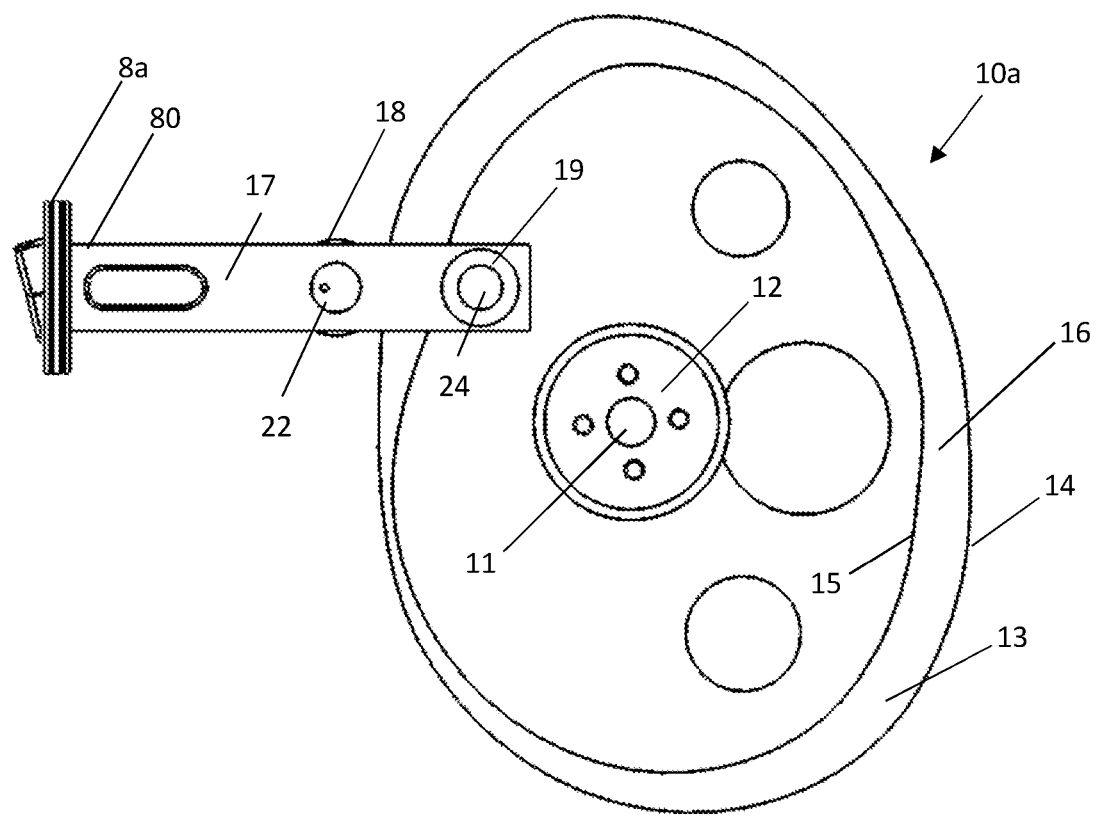
FIGS. 3a and 3b show side and perspective views the power transfer mechanism for one of the pistons in the engine with certain components omitted.
Figure 3B:
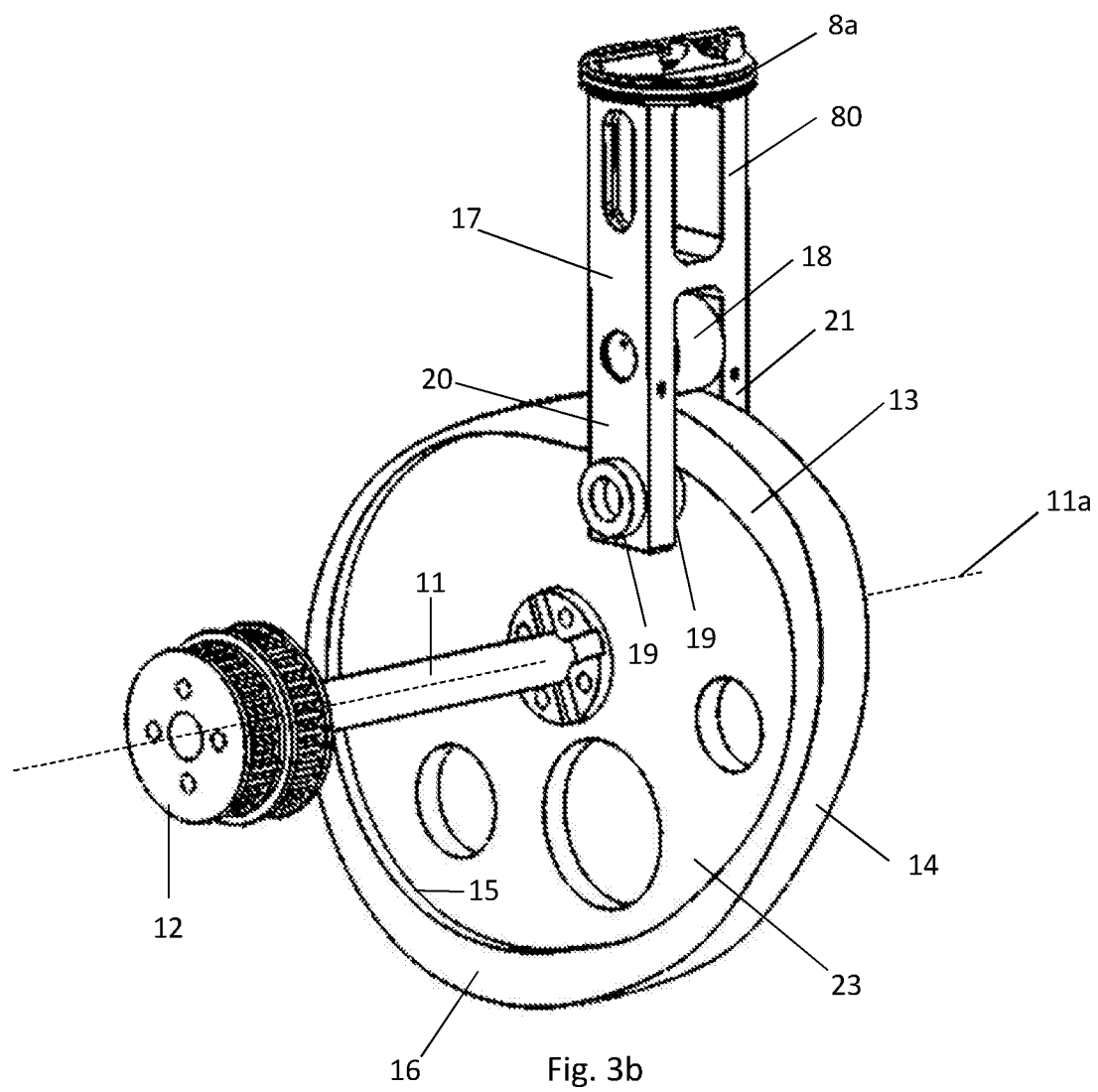

The first piston assembly is shown in FIGS. 3a and 3b. The first piston assembly 10a comprises a piston 80 with a piston head 8a movable within the cylinder liner 7a (visible in FIG. 2). The piston head 8a is coupled to an output shaft 11 having an axis of rotation 11a and an output flange 12 via a track 13. The track 13 is mounted on and rotationally fixed with respect to the output shaft 11 via a spline connection (not visible). The track 13 rotates with the output shaft 11 about the axis of rotation 11a relative to the piston head 8a and the cylinder sleeve 7a.

Each track 13 has a radially outer cam surface 14 extending around its circumference. The track 13 also has a radially inner cam surface 15 located on an underside of an overhanging portion, the inner cam surface 15 facing away from the outer cam surface 14, i.e. in the opposite direction. A planar edge surface 16 extends between the outer and inner cam surfaces of the track 13.

The piston 80 includes the piston head 8a and a stabilising sliding element 17 connected to and extending below the piston head. The sliding element 17 and piston head 8a are integrally formed in the illustrated embodiment, but alternatively the sliding element 17 may be formed as a separate part from the piston head 8a and connected by fasteners, e.g. bolts. The piston 80 further includes followers mounted on the sliding element 17 which run on the respective inner and outer cam surfaces of the track to control motion of the piston. In the illustrated embodiment, the followers comprise a single outer cylindrical roller 18 and four inner cylindrical rollers 19, each rotatably mounted to the piston 80.

The outer cylindrical roller 18 has a cylindrical outer radial surface which runs on the outer cam surface 14 of the track 13 and transmits load between the piston 80 and the track 13. The inner cylindrical rollers 19 comprise two pairs of cylindrical rollers. In each pair of rollers, there is a track follower which runs on the inner cam surface 15 of the track 13, and a timing wheel follower which runs on an inner cam surface of a timing wheel which will be described later. The stabilising sliding element 17 has a bifurcated construction forming a left limb, or arm, 20 and a right limb, or arm, 21. The arms 20, 21 depend downwardly away from the piston head 8a so as to straddle either side of the track 13. The outer cylindrical roller 18 is rotatably mounted on a journal 22 extending between the left arm 20 and the right arm 21 such that the roller 18 is captive between the arms 20, 21.

The inner cylindrical rollers 19 are arranged in pairs, one pair on each respective arm 20, 21. The track following roller of the pair of inner rollers 19 is held captive between the arm 20 and the track wheel centre 23. The timing wheel follower of the pair of inner followers 19 is held captive between the arm 20 and the timing wheel. The inner cylindrical rollers 19 are mounted on a journal 24 fixed to the left arm 20 of the stabilising sliding element 17. A similar pair of rollers 19 on a journal 24 is mounted at the lower end of the right arm 21 of the bifurcated stabilising sliding element 17. The profile of the inner and outer cam surfaces 14, 15 of the track 13 are profiled such that as the track 13 rotates about shaft axis 11a the outer cylindrical roller 18 and the inner cylindrical rollers (track followers) 19 maintain continuous rolling contact with the outer and inner cam surfaces 14, 15 of the track. Since the outer and inner cam surfaces 14, 15 of the track 13 are non-circular about the rotation axis 11a, the piston head 8a is caused to move in reciprocating linear motion within the cylindrical inner surface of the piston liner 7a, the piston moving in reciprocating linear motion in accordance with the profile of the track.

The piston 80 is shown in greater detail in FIGS. 4a and 4b. The arms 20, 21 of the bifurcated stabilising sliding element 17 are substantially planar and parallel and are dimensioned so as to provide a clearance fit with the planar side surfaces 16 of the track 13. The piston 80 includes several weight-saving cut-outs 25 beneath the piston head 8a. The stabilising element 17 includes oil pick-ups 26 which are arranged to receive oil under pressure and to distribute this around the piston 80 via internal oil passages to locations requiring lubrication, for example the interface between the outer cylindrical roller 18 and the journal 22 and the interfaces between the inner cylindrical rollers 19 and the journals 24.

Figure 5:
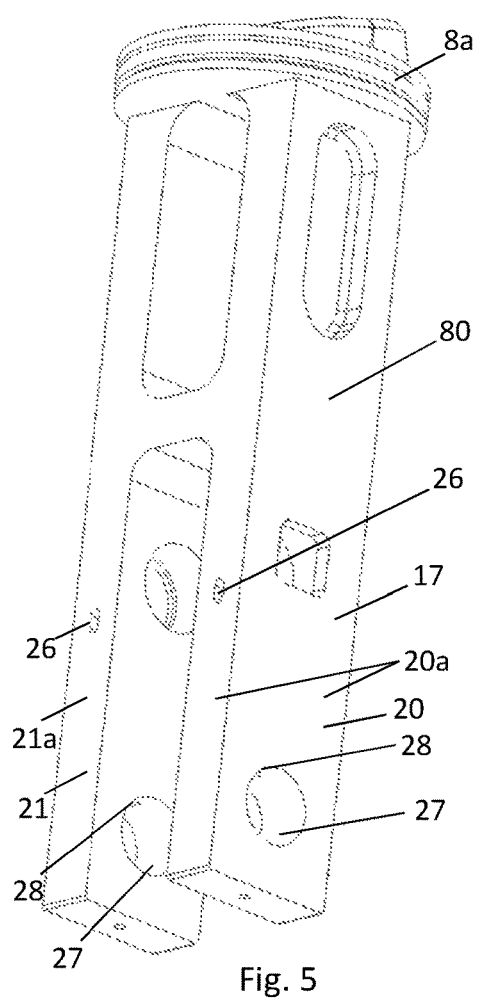
FIG. 5 shows the piston and sliding element with the followers omitted.
Figure 6:
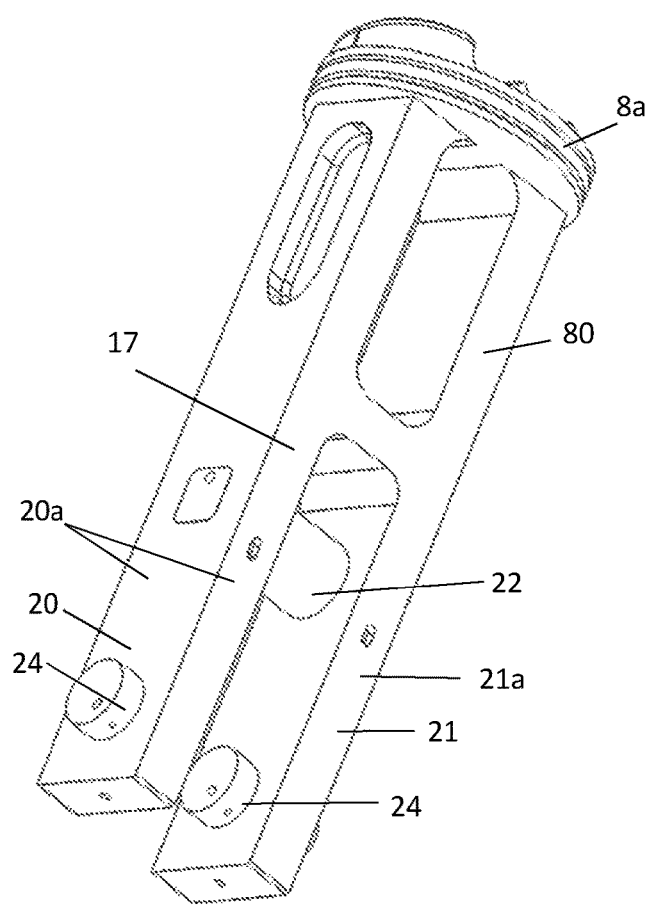
FIG. 6 shows the piston and sliding element with the follower mountings attached.
Figure 7A:
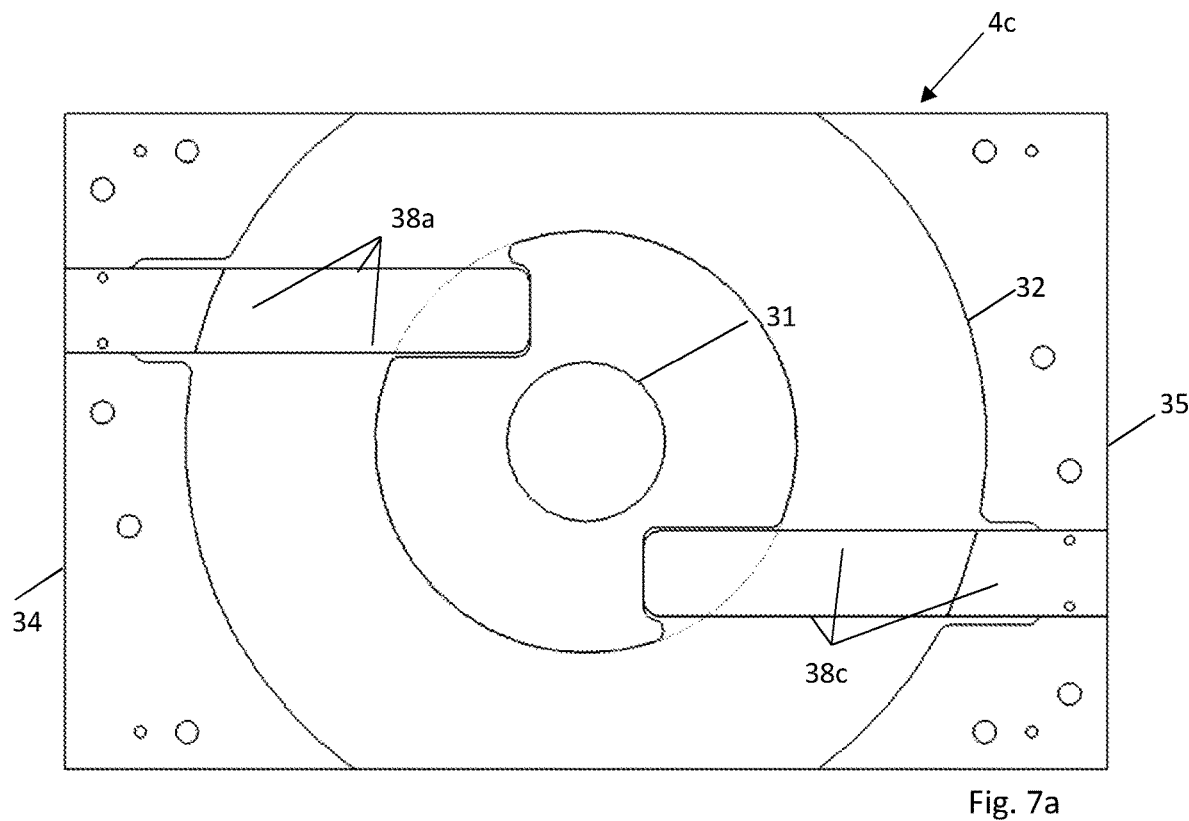
FIGS. 7a to 7e show side, top, other side, end and perspective views of the fin plate of the engine.
Figure 7B:
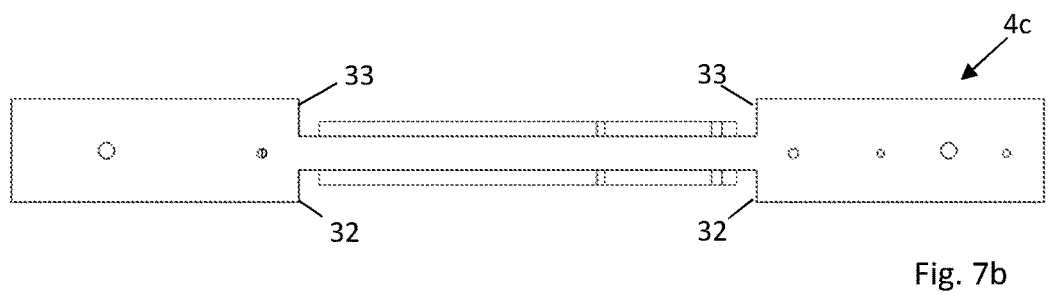
Figures 7C, 7D:
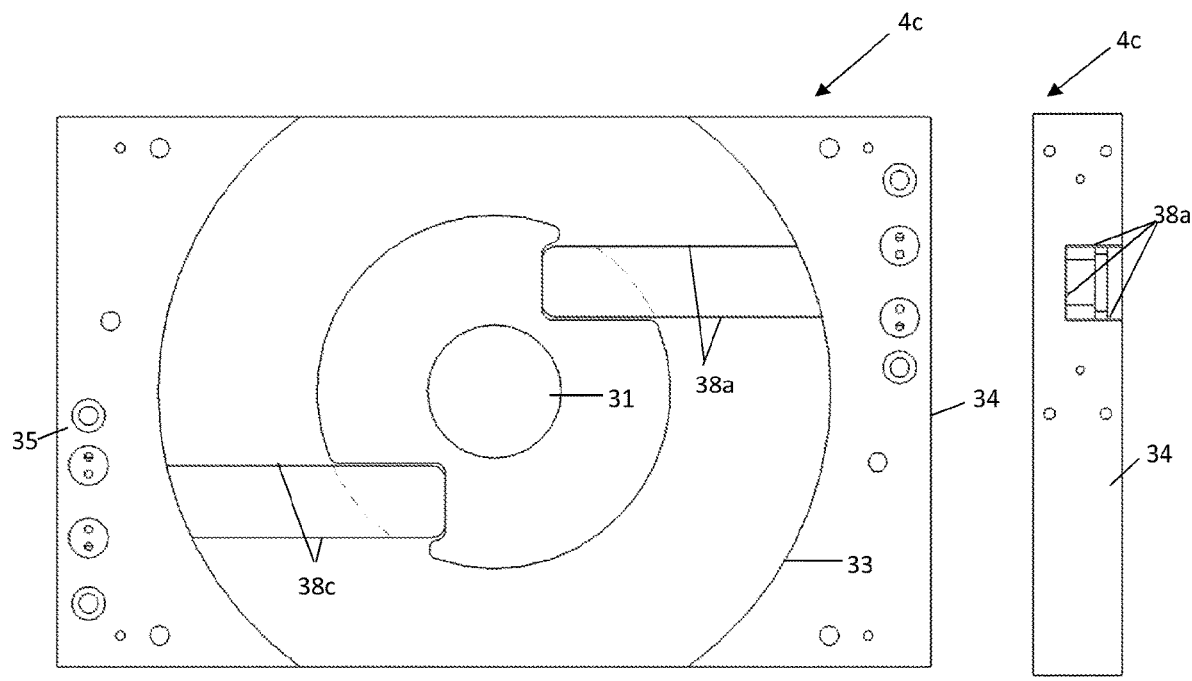
Figure 7E:
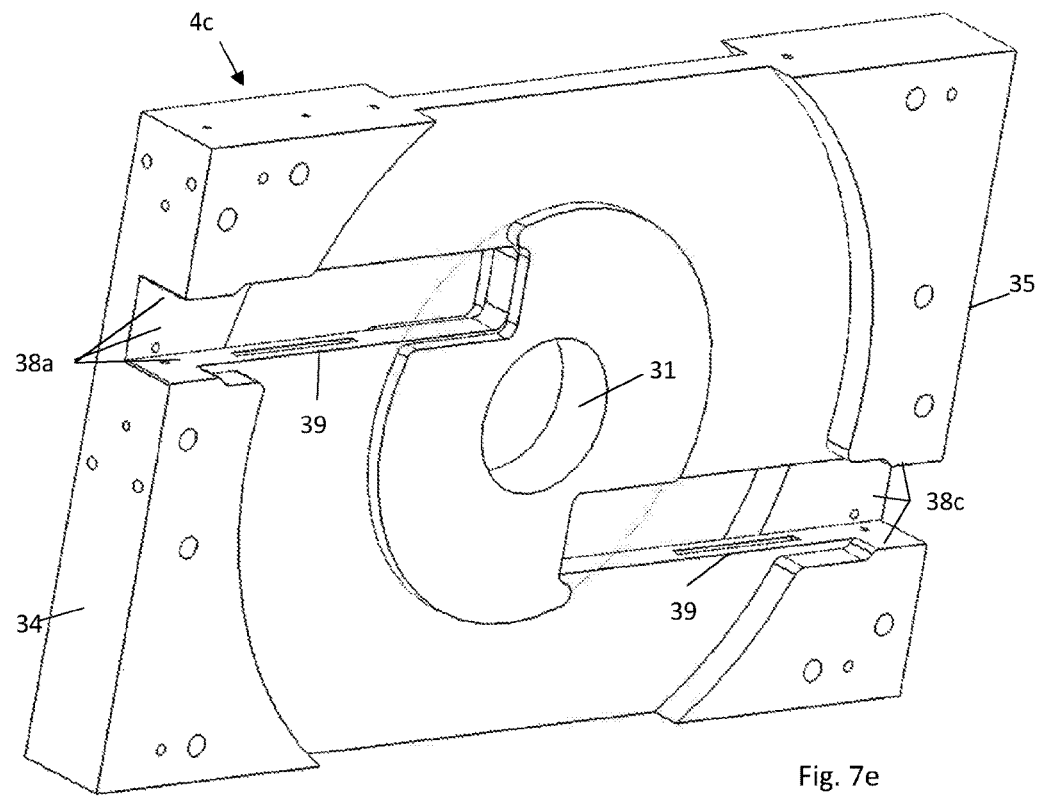

FIG. 5 shows the piston 80 with the followers and their respective journals removed, and FIG. 6 shows the piston 80 with only the journals for the followers in situ. As can be seen from FIG. 5, the circular apertures 27 for receiving the journals 24 each have an oil delivery aperture in fluid communication with the oil pick-ups 26. The journal 22 for the outer cylindrical roller 18 is generally cylindrical with one end cut back to form a generally square profile to prevent rotation of the journal 22. The ends of journal 22 are located respectively in substantially square and substantially circular apertures in the arms 20, 21 of the piston 80.

The arms 20, 21 of the bifurcated stabilising element 17 each comprise a profiled slider surface 20a, 21a. The profiled slider surfaces 20a, 21a engage a corresponding profile in the block assembly 2. As can be seen from FIGS. 5 and 6 in particular, the profiled slider surface 20a and the profiled slider surface 21a each have a generally U-shaped profile. The profile of the slider surface 20a is substantially a mirror image of the profile of the slider surface 21a. The profiled slider surfaces 20a, 21a constrain the motion of the piston 80 for movement only along the longitudinal axis of the cylindrical cylinder liner 7a. This constraint ensures that the facing surfaces of the arms 20, 21 of the bifurcated stabilising sliding element 17 do not contact the side surfaces 16 of the track 13.

FIGS. 7a to 7e illustrate one of the fin plates 4c that make up the block assembly 2 as shown in FIG. 2. The fin plates 4c and 4e are identical and the fin plates 4d and 4f are mirror images of the fin plates 4c. The fin plate 4c is, in the illustrated embodiment, a machined metallic plate having fixing holes for securing to neighbouring plates 4a, 4d, 6a, 6b, 5a and 5b of the block assembly 2. The plate 4c has a through-bore 31 which receives the rotatable shaft 11. The plate 4c is arranged to receive a track wheel 13 on one side of the bore 31 and to receive a timing wheel 30 on the other side of the bore 31. As illustrated, the track wheel 13 is arranged to sit within recess 32 on the first side of the fin plate shown in FIG. 7a, and the timing wheel 30 is arranged to sit within recess 33 on the opposite side of the fin plate shown in FIG. 7c.

The fin plate 4c has a pair of cut-outs forming a generally U-shaped profile extending from opposing end faces 34, 35 of the plate 4c. These cut-outs are the casing profiles 38a, 38c which are shaped to correspond with the generally U-shaped profiles 20a, 21a of the bifurcated stabilising sliding element 17 of the pistons 80. On each side of the generally U-shaped profiles 38a, 38c is an oil delivery slot 39 which each cooperate with one of the oil pick-ups 26 of the piston 80. As the sliding element 17 of the piston 80 slides within the respective profiles 38a, 38c of the fin plate 4c of the block assembly 2, the oil pick-up 26 moves over the elongated slot 39 to maintain continuous oil delivery from the block assembly 2 to the parts of the piston 80 which require lubrication. Oil is delivered to the elongated slots 39 through oil delivery conduits formed in the fin plate 4c. The length of the cut-outs in the fin plate 4c which form the casing profiles 38a, 38c are longer than the intended path of reciprocating linear motion of the piston 80 such that any build up in the engine does not impede motion of the piston 80. By arranging the fin plate 4c and its mirror counterpart 4d back-to-back on either side of the piston 80, and by matching the profile of the slider surfaces 20a and 21a to the casing profiles, the motion of the piston 80 is constrained by its stabilising sliding element 17 for motion only along the longitudinal axis of the cylinder liner 7a.

Figure 8A:
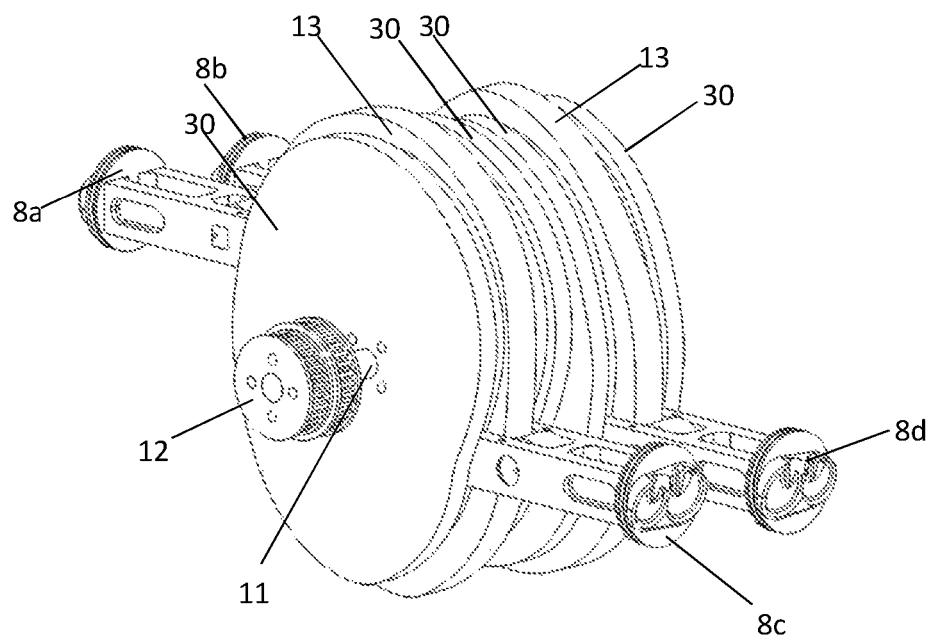
FIG. 8a and 8b show perspective and side views of the power transfer mechanism having two tracks and two pistons per track.
Figure 8B:
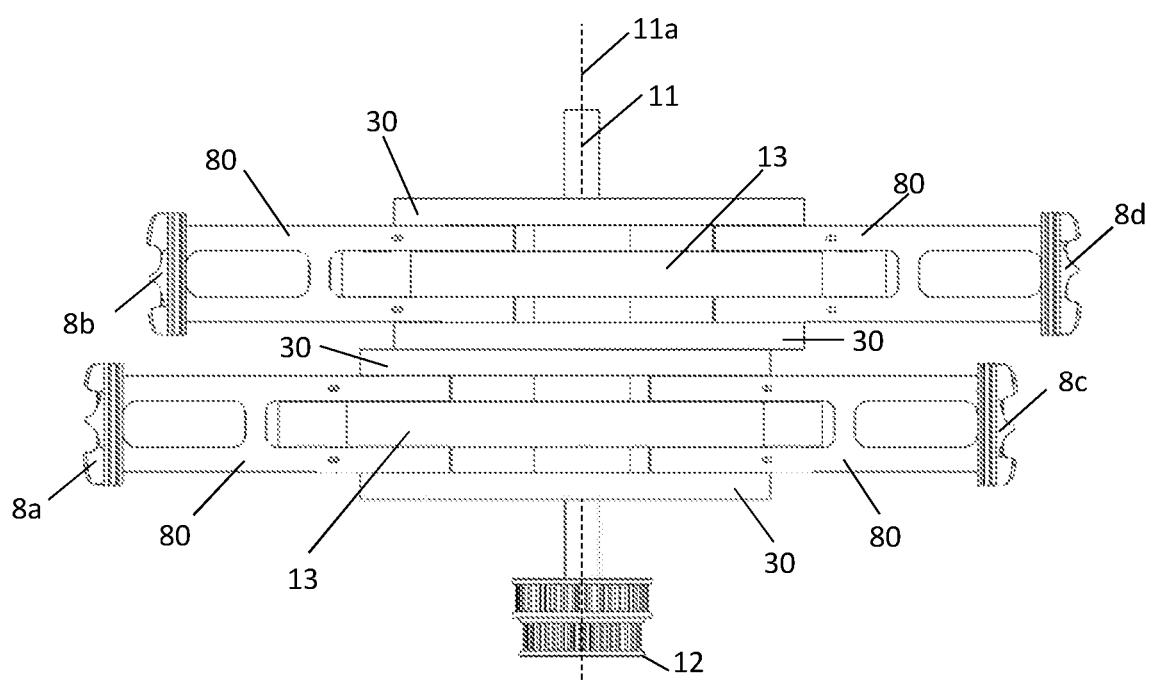

Although in FIG. 3a only a single piston 80 mounted on a single track 13 is shown, the engine 1 illustrated has two tracks 13 and four pistons 80 as mentioned above. FIGS. 8a and 8b illustrate perspective and top plan views of the piston arrangement in the engine 1 so as to show all four piston heads 8a, 8b, 8c, and 8d arranged on two identically profiled tracks 13 arranged 180 degrees out of phase with one another on the shaft 11. Each track 13 has a pair of pistons 8a, 8c and 8b, 8d. The pistons 8a, 8c are arranged in an opposed relationship on the track 13 so as to move along parallel but offset paths of linear reciprocating motion. The pistons 8b, 8d are similarly arranged. By providing the piston arrangement having the tracks 13 180 degrees out of phase with one another and by having two pistons per track in an opposed relationship on offset parallel axes, perfect weight balancing of the engine 1 is achievable without any additional counterweights.

As best shown in FIG. 8b, each track 13 is accompanied by a pair of timing wheels 30 arranged on opposite sides of the track 13. Each timing wheel 30 has an inner cam profile identical to that of its accompanying track 13. The timing wheels 30 are fixed to rotate with the shaft 11 such that the angular position of the track 13 and its accompanying two timing wheels is always synchronised. Since one track 13 is 180 degrees out of phase with the other track 13, the two pairs of timing wheels 30 are similarly arranged 180 degrees out of phase with the other pair of timing wheels 30 about the shaft axis of rotation 11a.

In operation of the engine, the outer cylindrical rollers 18 of each of the four pistons bear against and roll along the outer cam surfaces 14 of the tracks 13, and the inner cylindrical rollers 19 of each of the four pistons bear against and roll along the inner cam surfaces 15 of the tracks 13 and of the timing wheels 30. As the tracks 13 and timing wheels 30 rotate with the engine 1, the piston heads 8a to 8d move within their respective cylinder sleeves 7a to 7d in accordance with the path shape of the tracks 13 and timing wheels 30.

During some portions of the operating cycle the pistons are driven by the track, for example during intake, compression and exhaust strokes. During some portions of the operating cycle the track is driven by the piston such that work can be extracted from the output shaft 11, for example during power strokes. Since the path shape of the tracks 13 and their accompanying timing wheels 30 may be given any desired shape the piston is not constrained to follow simple harmonic motion as in most conventional internal combustion engines but can instead have any desired displacement profile. The displacement profile may, for example, include multiple different local top dead centre positions at different heights and/or multiple different bottom dead centre positions at different heights. As can be seen from FIG. 3a, the track 13 is shaped such that the piston completes 4 strokes for every output shaft revolution and experiences top dead centre positions and different bottom dead centre positions at different heights.

Although in the illustrated embodiment the engine comprises two tracks and four pistons, in alternative embodiments an engine may comprise any number of tracks (for example 1, 2, 3 or more) and may have any number of piston arrangements (for example 1, 2, 3 or more) operated by each track. Depending on the number of tracks and pistons some weight-balancing of the engine may be required to cancel engine vibration.

Figure 9A:
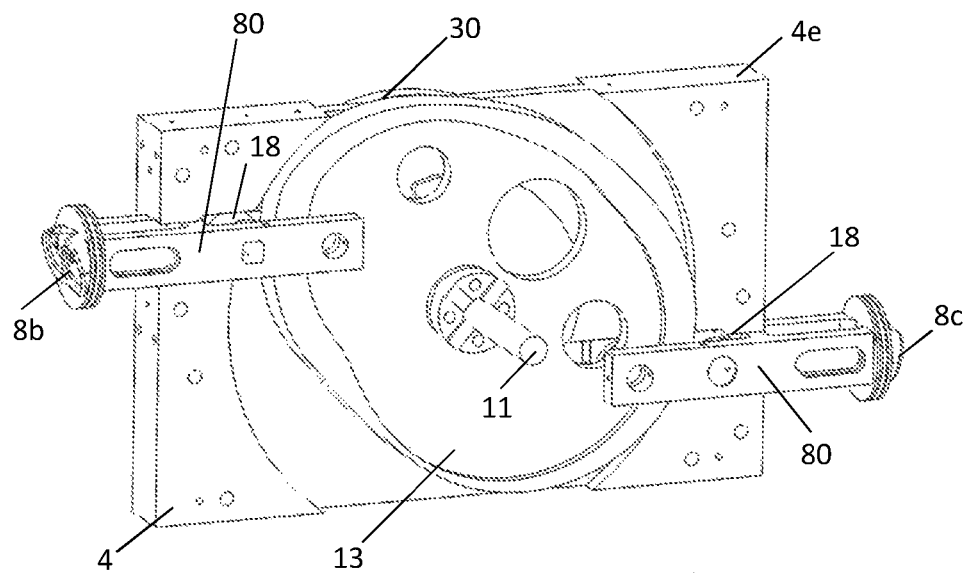
FIGS. 9a to 9h show the engine at various stages during assembly.

The engine is assembled by the following steps, with reference to FIGS. 9a to 9h. The method recited below does not include all steps required to assemble all of the components forming part of the engine 1 but has instead been reduced to the major steps for assembling the power transfer mechanism and casing for clarity:

Arrange track 13 and timing wheel 30 on opposite sides of fin plate 4e and couple to shaft 11, then insert pistons 8b and 8c without follower 19 until followers 18 contact the outer cam surface of track 13 (FIG. 9a).

Figure 9B:
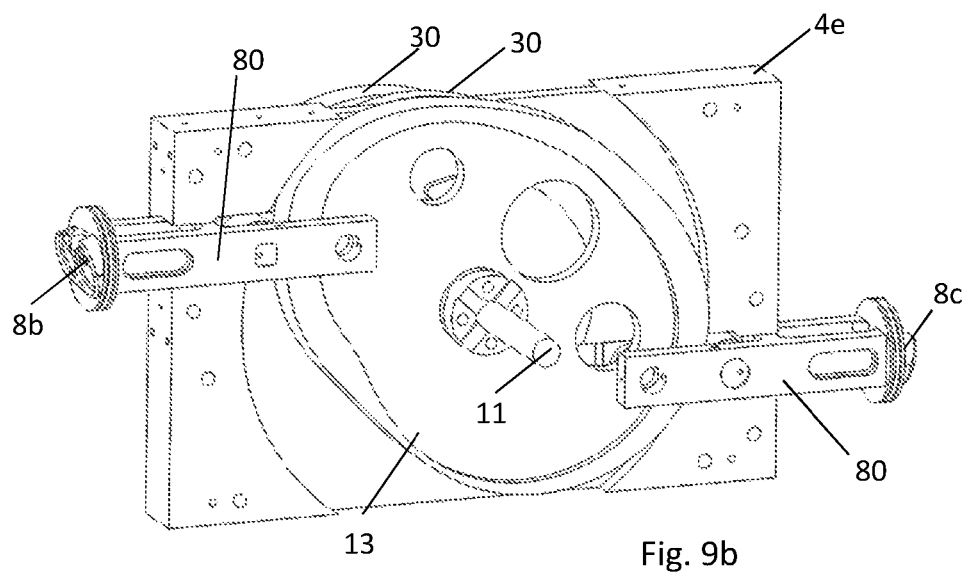

Feed the second timing wheel 30 over the far end of shaft 11 so as to be 180 degrees out of phase with the first timing wheel 30 (FIG. 9b).

Figure 9C:
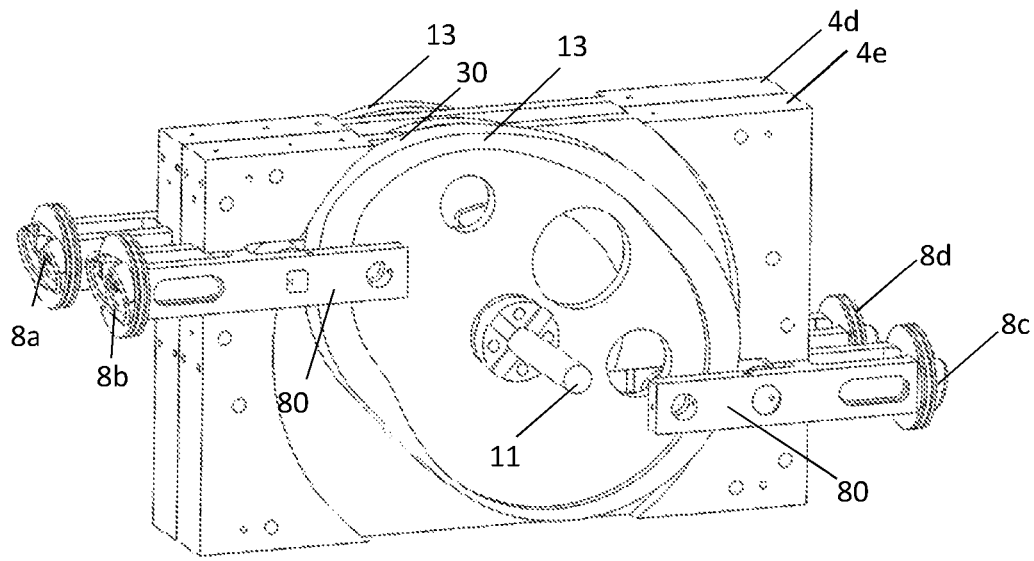

Feed fin plate 4a over the far end of shaft 11 and bring into contact with fin plate 4e, then feed the second track 13 over the far end of shaft 11 and insert pistons 8a and 8d with the followers 19 removed (FIG. 9c).

Figure 9D:
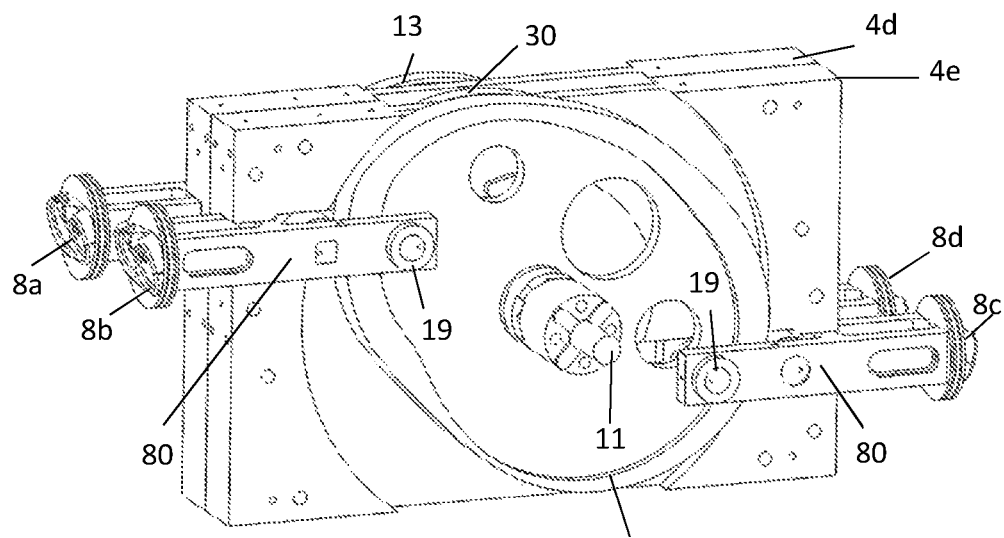

Attach all four pairs of inner cylindrical rollers (followers) 19 to the four pistons 80 so as to couple all four pistons to the two tracks 13 (FIG. 9d).

Figure 9E:
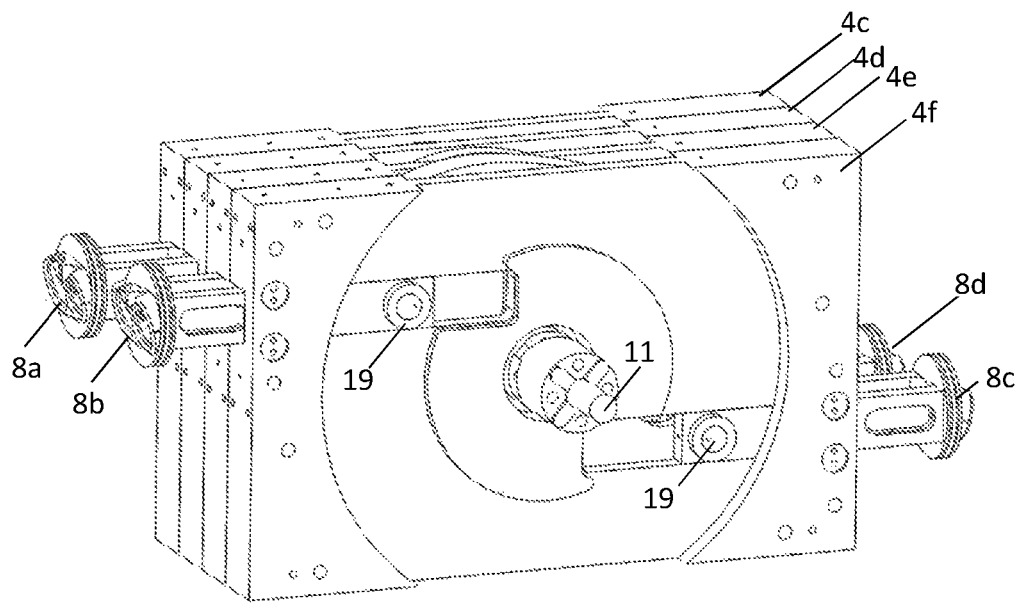
Figure 9F:
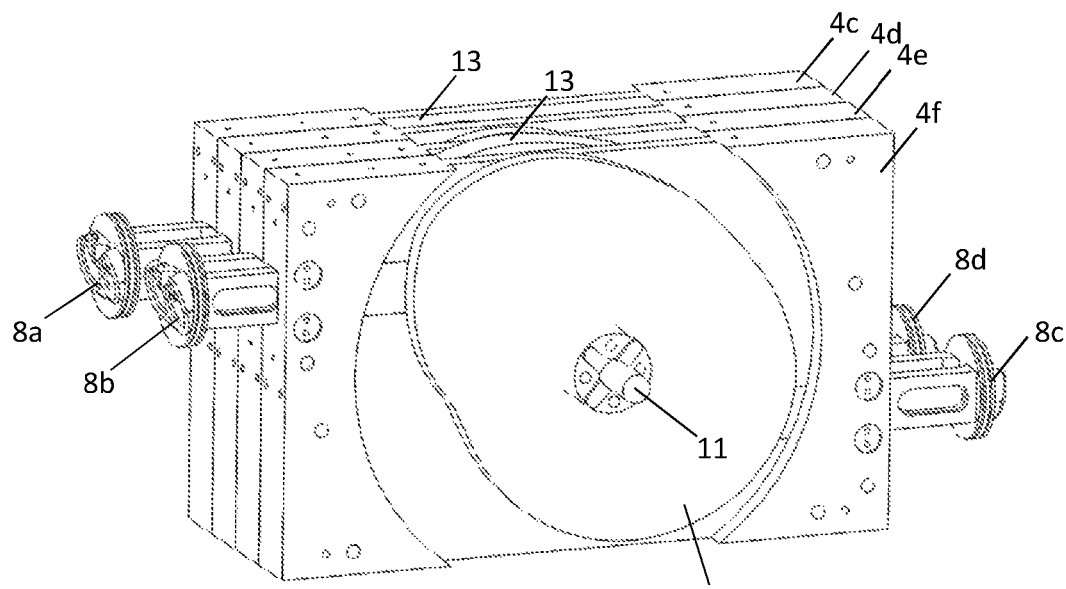

Attach fin plate 4f and fin plate 4c to opposite sides of the two tracks 13 (FIG. 9e).

Figure 9G:
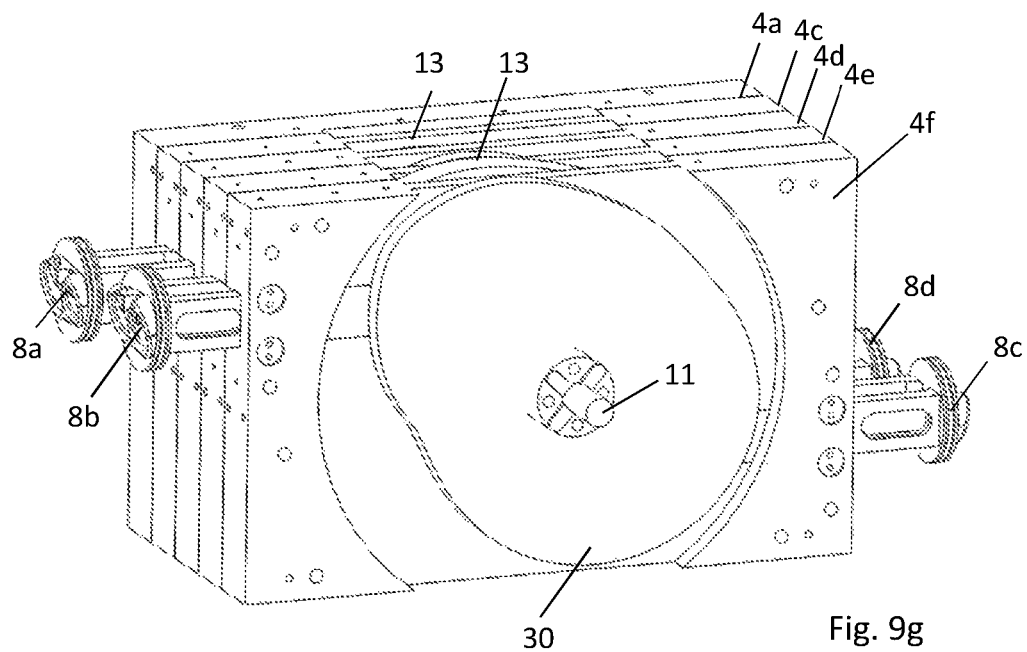

Attach the two further timing wheels 30 (again 180 degrees out of phase with one another) to the open sides of the block assembly (FIG. 9g).

Figure 9H:
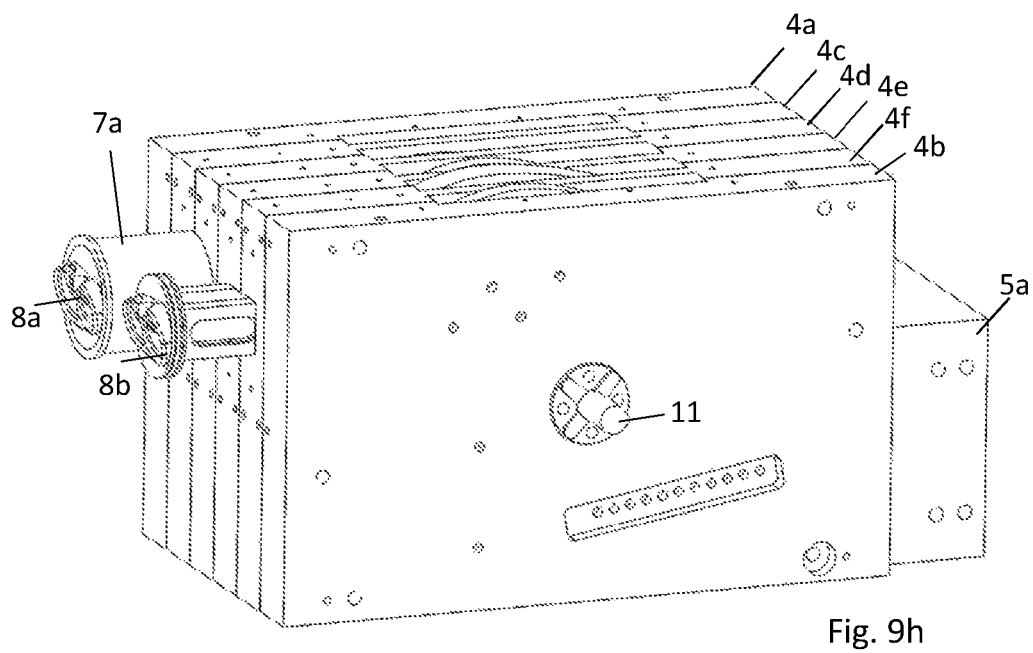

Attach end plates 4a and 4b to complete the main section of the block assembly and install cylinder liners and end plates 5a, 5b (FIG. 9h).

Once the plates of the engine block are all assembled, the plates are fixed together, e.g. by bolting, before the addition of the two head assemblies 3a, 3b and the top and bottom covers 6a, 6b so as to complete the engine as shown in FIG. 1.

The tracks 13, timing wheels 30 and spacers mounted along the shaft 11 may be all bolted together through hubs of the tracks, timing wheels and spacers. Needle rollers may be provided around each of the tracks and timing wheels, the needle rollers mounted spaced from the plates.

Although in the illustrated embodiment the profiled slider surface and corresponding casing profile are substantially U-shaped, these profiled surfaces may take different shapes. The cut out forming the casing profile may in alternative embodiments be enlarged to receive a separate insert having inner an profile that contacts the profiled slider surface.

Figure 10:
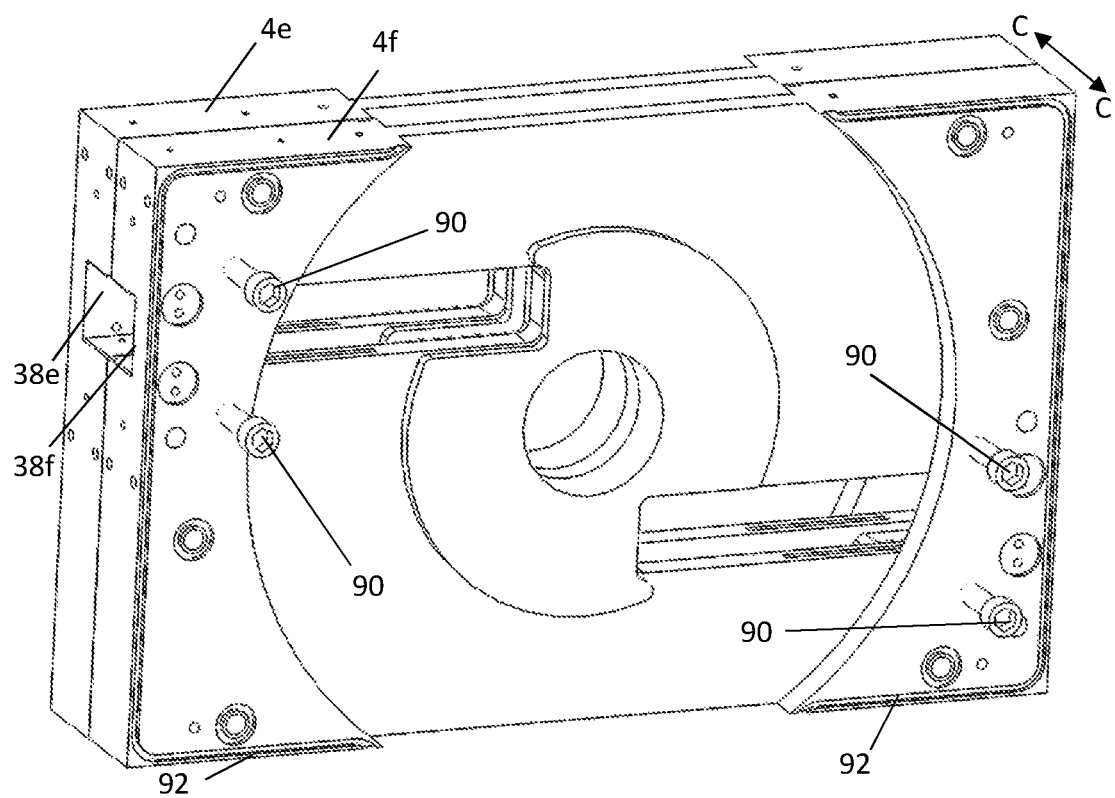
FIG. 10 shows an adjuster between the plates of the engine casing.

FIG. 10 shows an optional adjuster mechanism between the casing fin plates 4e and 4f. A similar adjuster mechanism may be provided between the fin plates 4c and 4d. The adjuster mechanism in the illustrated example includes four adjuster bolts 90, although a different number of bolts or other adjustment means may be used. The adjuster bolt heads are accessed through a clearance hole (not shown) in the casing side plate 4b from outside the engine, and similarly the adjuster bolt heads for the adjuster mechanism for the fin plates 4c and 4d are accessed through apertures in the casing side plate 4a. The adjuster mechanism acts to push the plate 4f away from plate 4e in the direction of arrows C-C, which in the illustrated example is by rotating the threaded bolts 90 in respective threaded holes in plate 4f, which causes the shank ends of the bolts to bear against plate 4e. This adjustment can be used to set the clearance between the outer side surfaces of the stabilising eliding element 17 of the piston 80 and the U-shaped profiles 38e, 38f of the casing.

The threaded holes of the adjuster bolts 90, as well as the holes for the bolts holding the plates 4a-4f of the casing together, may have o-rings. Further optionally, the plates may have a groove 92 for receiving a seal or sealant material for sealing between adjacent plates.

Although the invention has been described above with reference to one or more preferred embodiments, it will be appreciated that various changes or modifications may be made without departing from the scope of the invention as defined in the appended claims.

The invention claimed is:

1. An internal combustion engine comprising:
a piston arrangement including a piston coupled to a track, wherein the track is coupled to a shaft and has a cam surface, and the piston has a follower which runs on the cam surface of the track to control motion of the piston;
a casing, wherein the casing comprises at least two fin plates having a cutout for receiving the track and a bore for receiving the shaft, and
at least two end plates coupled transverse to the fin plates;
wherein at least one cylinder bore is formed in the end plates, and the piston is arranged to move in reciprocating motion in the cylinder bore, and
wherein the fin plates are arranged in abutment, wherein the piston comprises a piston head arranged outside the at least two fin plates and within the at least one cylinder bore of one of the at least two end plates.

2. The internal combustion engine according to claim 1, wherein the fin plates are attached together by a plurality of fasteners.

3. A method of assembling an internal combustion engine comprising a casing and a piston arrangement including a piston coupled to a track;
wherein the track is coupled to a shaft and has an inner cam surface and an outer cam surface, and the piston is coupled to the track by followers which run on the respective inner and outer cam surfaces of the track to control motion of the piston; wherein a sliding element is connected to the piston, the sliding element extending below the piston head and comprising a profiled slider surface which engages a corresponding profile in the casing, and the followers are mounted on the sliding element; wherein the casing comprises at least two fin plates having a cutout for receiving the track and a bore for receiving the shaft, and at least two end plates, wherein at least one cylinder bore is formed in the end plates, and the piston is arranged to move in reciprocating motion in the cylinder bore; the method including the steps of: coupling the piston arrangement to the shaft by coupling the track to the shaft and coupling the piston to the track; bringing the at least two fin plates together into abutment on either side of the track; and bringing the end plates together so as to be transverse to the plates; and coupling the end plates to the fin plates, wherein the piston comprises a piston head arranged outside the at least two fin plates and within the at least one cylinder bore of one of the at least two end plates.

4. The internal combustion engine according to claim 1, further comprising a cylinder liner disposed in the cylinder bore.

5. The internal combustion engine according to claim 1, wherein the piston has a piston head moveable within the cylinder bore.

6. The internal combustion engine according to claim 5, further comprising a cylinder liner within the cylinder bore, and wherein the piston head is moveable within the cylinder liner.

7. The internal combustion engine according to claim 1, wherein the track has an inner cam surface and an outer cam surface, and the piston is coupled to the track by followers which run on the respective inner and outer cam surfaces of the track to control motion of the piston.

8. The internal combustion engine according to claim 7, wherein the track is a radial track with the cam surfaces arranged as inner radial and outer radial surfaces with respect to an axis of rotation of the track.

9. The internal combustion engine according to claim 1, wherein the cam surface is arranged to be lubricated such that the follower contacts the cam surface via a layer of lubricant.

10. The internal combustion engine according to claim 1, further comprising a plurality of the piston arrangements so as to comprise a plurality of the pistons coupled to one or more of the tracks.

11. The internal combustion engine according to claim 1, further comprising at least two head assemblies, each head assembly being disposed on a respective end plate.

12. The internal combustion engine according to claim 1, wherein the piston is a first piston, and further comprising a second piston coupled to the track, the second piston having a follower which runs on the cam surface of the track to control motion of the second piston, the second piston being disposed in a second cylinder bore formed in a second one of the end plates.

13. The internal combustion engine according to claim 12, wherein the first piston and the second piston are arranged in an opposed relationship, optionally wherein the opposed pistons are arranged so as to move along parallel but offset paths of linear reciprocating motion.

14. The method according to claim 3, further comprising coupling a head assembly to each of the end plates.

15. The method according to claim 14, wherein the fin plates and the end plates are fixed together before the head assemblies are coupled to the end plates.

16. The method according to claim 3, further comprising installing a cylinder liner in the first cylinder bore.

* * * * *